United States Patent [11] 3,633,920

[72] Inventor Itsuki Ban
829, Higashi-Oizumimachi, Nerima-ku, Tokyo-to, Japan

[21] Appl. No. 34,737
[22] Filed May 5, 1970
[45] Patented Jan. 11, 1972
[32] Priorities May 8, 1969
[33] Japan
[31] 44/34784;
May 21, 1969, Japan, No. 44/38720

[54] TAPE CARTRIDGE POSITIONING APPARATUS

8 Claims, 3 Drawing Figs.

[52] U.S. Cl. .......... 274/4 B, 179/100.2 Z, 242/55.19 A, 274/4 D
[51] Int. Cl. .......... G11b 5/54, B65h 17/20, B65h 17/48
[50] Field of Search .......... 242/55.19 A, 55.19, 197, 198; 274/4 D, 4 B, 4 F, 4 G, 4 C, 11 B, 11 C, 11 D; 179/100.2 Z, 100.2 S; 226/178, 118

[56] References Cited

UNITED STATES PATENTS

| | | | |
|---|---|---|---|
| 2,898,409 | 8/1959 | Tiger | 242/55.19 A X |
| 3,009,024 | 11/1961 | Eash | 179/100.2 Z |
| 3,471,096 | 10/1969 | Hancock | 242/55.19 A |
| 3,478,973 | 11/1969 | Lear | 242/55.19 A |
| 3,561,767 | 2/1971 | Negishi | 274/4 G |

*Primary Examiner*—Billy S. Taylor
*Attorney*—Jacobs and Jacobs

ABSTRACT: A magnetic tape cartridge player laterally receives an endless tape cartridge in a slide mechanism which is released by a solenoid operated latch lever to permit associated springs to move the slide mechanism and cartridge from a loading nonplay position to a play position. The slide and cartridge are returned from play position by actuating a switch causing a portion of the lever mechanism to start a timing mechanism into running condition, i.e., the slide mechanism portion pivots a lever to cause a friction roller on the lever to engage and be driven by the tape driving capstan, the roller in turn driving through speed reduction gearing to a cam which after one revolution urges the slide and cartridge carried thereby from the play position back to a loading, nonplay position.

TAPE CARTRIDGE POSITIONING APPARATUS

BACKGROUND OF THE INVENTION

The present invention relates to an endless magnetic tape cartridge player, and more particularly to a novel tape cartridge positioning apparatus wherein an endless magnetic tape cartridge insertable in the player is automatically positioned in the play position and is automatically moved from the play position to the nonplay position when the play is stopped.

The conventional type of the tape cartridge player has been adapted so that the endless tape cartridge is longitudinally inserted in the player housing and located in the play position. For locating the cartridge in the play position, it has been proposed that a retention roller is provided at the free end of a leaf spring the other end of which is mounted to the player deck, with the retention roller being inserted in a notch formed in the cartridge sidewall under the influence of the leaf spring. With this arrangement, the retention roller presses the inclined wall of the notch by the bias of the leaf spring. In this instance, if the bias of the leaf spring is improper or the position of the retention roller is out of order, the position of the cartridge relative to a rotary capstan for driving the tape in the cartridge or a magnetic head adapted to transduce the tape is inadequate and results that the running speed of the tape is unstable to thus produce now flatter or the like thereby deteriorating the reproducing sound tone. The cartridge to be played is limited to its configuration or its shape since it must be provided with a certain notch in a given position. Thus, the interchangeability of the cartridge is impeded to cause the user inconvenience.

The tape cartridge player which receive the cartridge in the longitudinal manner allows the cartridge to project from the front panel of the player to some extent so as to grasp the rear edge when it is desired to stop the cartridge play and to thus escape it out of the player. This construction is unsatisfactory when used in the vehicle because the project end of the cartridge extending from the front panel of the player injures human body when an accident happens to the vehicle. Further, such the player is arranged so that a magnetic head is located in the innermost position, and it is difficult to check a stain or spot and thus to require to use a specific tool to wash out it.

The inventor has succeeded in obtaining a novel tape cartridge positioning apparatus whereby shortcomings derived from the conventional apparatus will be overcome.

SUMMARY OF THE INVENTION

It is a primary object of the present invention to provide a tape cartridge positioning apparatus for an endless magnetic tape cartridge, which is capable of locating the tape cartridge in the play position without depending upon a notch or the like formed in the tape cartridge.

Another object of the invention is to provide a tape cartridge positioning apparatus for an endless magnetic tape cartridge player, wherein the tape cartridge is laterally inserted in the play position within the player housing in a manner that there is no portion projecting outwardly of the player housing.

A further object of the invention is to provide a tape cartridge positioning apparatus for an endless magnetic tape cartridge player, wherein a cartridge moving lever reciprocally movable in the direction perpendicular to the direction in which the cartridge is inserted in the player housing, the cartridge moving lever being engageable with the cartridge on the player deck and being on the deck for moving the cartridge from the nonplay position to the play position or moving back the same to the nonplay position, the lever being automatically released from its retention in response to the insertion of the cartridge in the player and being moved from a first position to a second position, the cartridge being advanced from the nonplay position to the play position and located in the play position when the lever is moved.

Yet another object of the invention is to provide a tape cartridge positioning apparatus for an endless magnetic tape cartridge player, wherein in response to the closing of a manual operating switch for stopping the cartridge play or detection of a conductive foil as an endmark on the tape the cartridge moving lever is returned from the second position to the first position by a cam rotatable by the rotational force of the capstan for driving the tape at the same time the cartridge is moved from the play position to the nonplay position.

Still another object of the invention is to provide a tape cartridge positioning apparatus for an endless magnetic tape cartridge player, wherein the cartridge is moved to the nonplay position and then pressed out of the player housing by a resilient member provided on the cartridge moving lever.

According to the present invention, the tape cartridge is adapted to be laterally inserted in the player housing to enable the magnetic head to locate adjacent an opening in the player housing. This arrangement will facilitate to check a spot or stain on the magnetic head and wash out the same.

These and other objects of the invention will be apparent from the following description and accompanying drawings in which;

DESCRIPTION OF THE PREFERRED EMBODIMENTS

Figure 1:
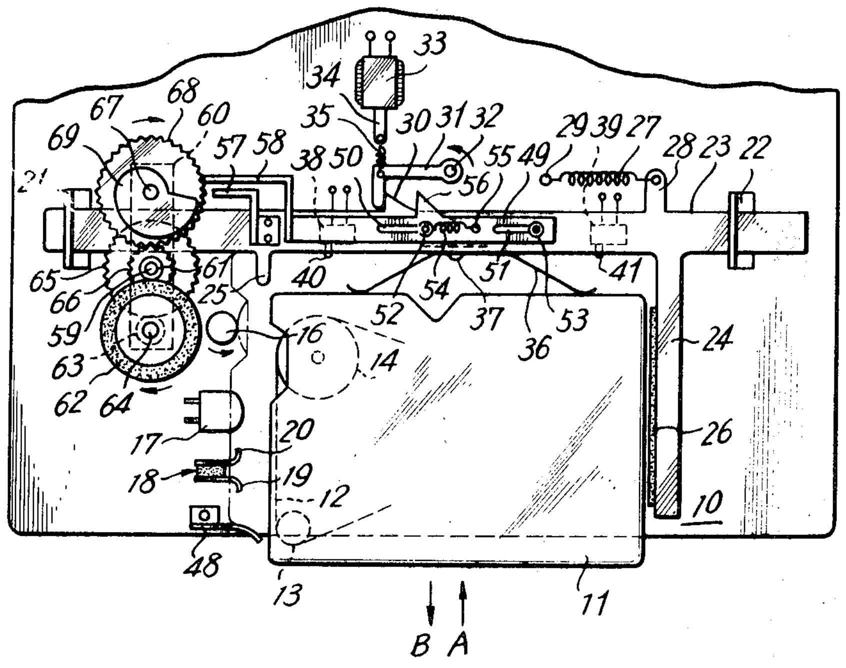
FIG. 1 is a representation schematically showing an embodiment of a tape cartridge positioning apparatus according to the present invention.

Referring now to the drawings, and in particularly to FIG. 1, the reference numeral 10 indicates a horizontal deck which is provided within a player housing (not shown) for a tape cartridge player playing an endless magnetic tape cartridge 11. The cartridge 11 include a generally rectangular housing with a centrally disposed reel (not shown) on which an endless magnetic tape 12 is wound and unwound in conventional manner. The tape 12 passes over a guide 13 and a pinch roller 14. The guide 13 and the pinch roller 14 are disposed adjacent the leading edge of the cartridge whereat the cartridge sidewall is cutaway or dispensed with and the tape 12 is extended from the center of the hub of the reel (not shown) about the guide 13 and thence about the pinch roller 14 back to outer periphery of a roll formed by the tape wound about the hub. The tape 12 is provided with a conductive patch or an endmark 15 (FIG. 2) thereon.

Much of the mechanism disposed beneath the deck 10 is omitted since it forms no part of the present invention. However, there shown on the deck 10 are a capstan 16 for driving the tape 12, a magnetic head 17 adapted to transduce the tape and an endmark detector 18. The capstan 16 is rotatably supported by a suitable bearing (not shown) mounted to the deck 10 thereunder and upwardly extends through a hole (not shown) bored through the deck. The capstan 16 is adapted to be rotatably driven by an electrical motor (not shown). The endmark detector 18 includes a pair of feeler contacts 19, 20 which are electrically separated from each other and shorted by the conductive patch 15 on the tape 15.

In a conventional endless magnetic tape cartridge player, the tape cartridge is longitudinally inserted in the cartridge player to allow the leading edge thereof to pass through an opening in the player housing. In contrast, according to the present invention, the tape cartridge is adapted to be laterally inserted in the cartridge player. For this reason, the opening in the player housing (not shown) is in a laterally elongated form and dimensioned to receive the cartridge laterally.

The tape cartridge positioning apparatus according to the present invention includes a cartridge moving lever 23 slidably supported by guides 21 and 22 fixed to the deck 10. The lever 23 is provided for moving the cartridge 11 which is inserted in the player housing from the direction of arrow A and is laid on the deck 10 toward the play position where the pinch roller 14 abuts against the capstan 16. The lever 23 has a relatively longer arm 24 adjacent one end of the lever and a relatively shorter front arm 25 adjacent the other end thereof. The distance between the two arms parallel to each other is slightly longer than the longitudinal length of the cartridge 11. The rear arm 24 is provided with a pad member 26 attached to the side in opposition to the front arm 25.

A comparatively heavy tension spring 27 is interposed between a projecting portion 28 of the lever 23 and a pin 29 connected on the deck 10 to normally urge the lever in the leftward direction. Leftward movement of the lever 23 due to the tension spring 27 is arrested by engagement of the projection 30 of the lever 23 with a substantially L-shaped latch lever 31 pivoted by a pin 32 mounted to the deck 10. The lever 23 is normally disposed in a first position. The latch lever 31 is biased by a spring (not shown) to maintain an engagement relationship with the projection 30. The latch lever 31 is connected through a spring 35 with a plunger 34 for a solenoid 33 mounted to the deck 10 and is swung by the plunger 34 to be disengaged from the projection 30 when the solenoid 33 is energized. A resilient member 36 comprises an elongated leaf spring and is mounted at its midportion by a rivet 37 to the cartridge moving lever 23. The resilient member 36 has its both end bent away from the lever 23. When the cartridge 11 is inserted in the player housing in the direction of arrow A, the cartridge sidewall engages the resilient member 36. Further insertion of the cartridge against the bias of the resilient member causes the cartridge to put it between the rear arm 24 and the front arm 25 of the lever 23 retained by the latch lever 31 in the first position.

A space is provided between the lever 23 and the deck 10 and controlled by the guides 21, 22. Two switches 38, 39 mounted to the deck 10 are disposed beneath the lever 23. The switches 38, 39 are normally opened and are caused to be closed by actuators 40, 41 which are depressedly operated by the sidewall of the cartridge 11 between the two arms 24, 25.

The details of a control circuit for the solenoid 33 including the switches 38, 39 will be described hereinafter.

The solenoid 33 is connected through a series connection of the switches 38, 39 and a parallel connection of a condenser 42 and a high value resistor 43 to a power source 44. In parallel connected to the parallel connection of the condenser 42 and the resistor 43 are a manually operated normal-opened switch 45 and the detector 18 via a switch 46. The switch 46 has a built in variable resistor 47 (indicated by the dotted lines) for adjustment or reproducing sound volume, incorporated in a reproducing circuit for the tape cartridge player and is adapted to be closed when the variable resistor 47 is opened to minimize the reproducing sound volume.

When the switches 38, 39 are closed by the cartridge 11 inserted in the tape cartridge player, the current from the power source 44 is applied in pulse fashion to the solenoid 33 for the period of time constant determined by the condenser 42 and the high value resistor 43. This causes the solenoid 33 to be actuated in pulse fashion. During the time that the switches 38, 39 are closed, the weak current is drained from the power source through the resistor 43 to the solenoid 33 but not enough to actuate the solenoid. In response to the closing the switches 38, 39, the solenoid 33 is energized in pulse fashion to instantly move the latch lever 31 to the position where it is disengaged from the projection 30 whereby retention of the lever 23 is released and is slidably moved leftward by the bias of the tension spring 27. Movement of the lever 23 allows the cartridge 11 to advance since the rear edge thereof is pressed by the rear arm 24. And, the pinch roller 14 is moved to the play position to engage the capstan 16. Abutment of the pinch roller 14 with the capstan 16 stops movement of the cartridge 11 and the lever 23 so that the lever 23 is located in a second position. A guide member 48 is mounted to the deck 10 for precisely guiding the leftwardly movable cartridge 11 to the play position. The cartridge 11 moved to the play position may be placed in position since the rear edge of the cartridge is pressed by the rear arm 24 under the influence of the tension spring 27 and the front edge corners of the cartridge are determined by the guide member 48 and the lever 23. A trigger lever 49 provided on the cartridge moving lever 23 has elongated slots 50, 51 to receive pins 52, 53 on the lever 23 and is thus slidably moved. A spring 54 is interposed between the pin 52 extending from the lever 49 and one portion 55 of the trigger lever 49. The trigger lever 49 is leftwardly biased when the lever 23 is located in the first position while the right ends of the slots 50, 51 engage the pins 52, 53. A projection 56 is formed of the trigger lever 49 and is engaged with the latch lever 31 when the cartridge moving lever 23 is moved from the first to the second position. The lever 49 with the lever 23 is leftwardly moved until the projection 56 engages the latch lever 31. Movement of the lever 49 is prevented when the projection 56 engages the latch lever 31. Thus, only the lever 23 is leftwardly moved. At the position where the lever 23 is moved to the second position, the pins 52, 53 are away from the right ends of the slots 50, 51 and the energy is stored in the spring 54. An arm 57 is mounted to the lever 23 and an arm 58 projects from the lever 49 at its left end. The details of these arms will be described later.

A driving means is provided for moving the cartridge moving lever 23 against the elastic force of the tension spring 27 and retracting the cartridge 11 from the play position and includes a swing lever 60 which is swingably provided by a sleeve 61 over a shaft 59 mounted to the deck 10. A rubber covered frictional idler wheel 62 and a gear 63 connected to each other are rotatably supported on an axis 64 on the swing lever 60. The wheel 62 as will be described later is caused to abut against the capstan 16 by rotation of the swing lever 60 from the position as shown to the counterclockwise direction and is rotatably driven by the capstan. Integrally formed gears 65 and 66 are rotatably supported on the shaft 59. The gear 65 is adapted to mesh with the gear 63. Rotatably mounted on an axis 67 on the swing lever 60 are a gear 68 and a cam 69 which are connected with each other, with gear 68 meshing with the gear 66. The gears 63, 65, 66 and 68 constitute a reduction gearing and rotation of the wheel 62 is reduced to be imparted to the cam 69. When he lever 23 is in the second position, the end of the arm 57 is adjacent to the dwell portion of the cam 69 and opposite thereto. On the other hand, the end of the arm 58 is adjacent to the edge of the swing lever 60 and opposite thereto.

If the variable resistor 47 is operated so as to close the switch 46 where the tape 12 within the cartridge 11 in the play position is transported by the operation of the capstan 16 and the pinch roller 14 across the detector 18 and the magnetic head 17, the conductive patch 15 on the tape passes through the detector 18 to short the feeler contacts 19, 20 of the detector and to energize the solenoid 33 by means of the power source 44. The solenoid 33 may be energized by the power source 44 if the switch 45 is manually operated when desired. Energization of the solenoid 33 moves the latch lever 31 to establish disengagement from the projection 56 of the trigger lever 49 whereby the trigger lever 49 is suddenly and leftwardly moved by the bias of the spring while the arm 58 comes in contact with the swing lever 60. As a result, the swing lever 60 is counterclockwise swung to allow the wheel 62 to abut against the capstan and rotated in the direction as shown. Rotation of the wheel 62 is imparted through the reduction gearing to the cam 69 to rotate it in the direction of the arrow as shown. The dwell portion of the cam 69 is initially opposite to the end of the arm 57 and rotation of the cam 69 allows the portion opposite to the arm 57 to move to the lobe portion, and thereby slidably contacting the arm 57. Accordingly, with rotation of the cam 69, the cartridge moving lever 23 moves from the second position to the rightward direction against the bias of the tension spring 27. As the lever 23 is moved, the leading edge of the cartridge 11 is depressed by the front arm 25 and the cartridge is moved back from the play position. At the same time, the trigger lever 49 is rightwardly moved to allow the arm 58 to retract from the swing lever 60, however, the arm 57 is caused to be in contact with the cam 69 so that the swing lever is maintained in the position where the wheel 62 abut against the capstan 16 to give abutment force produced between the wheel 62 and the capstan 16 to the bias of the tension spring 27. Since the projection 56 of the trigger lever 49 and the projection 30 of the cartridge moving lever 23 each has an inclined right end, they do not catch the latch lever 31 when the levers 49, 23, are rightwardly moved, and pass over the latch lever 31 while pressing the same. When the cam 69 is rotated to the extent that the lobe portion comes in contact with the arm 57 the lever 23 is moved just beyond rightwardly of the first position. Then the cam 69 is rotated through a turn and the lobe portion is away from the end of the arm 57, the lever 23 is slightly and leftwardly moved by the bias of the tension spring 27 and is retained in the first position upon engagement of the projection 30 with the latch lever 31. On the other hand, the arm 57 is disengaged from the cam 69 to reduce abutment force between the wheel 62 and the capstan 16 to stop rotation of the wheel 62. When the lever 23 is returned to the first position, the cartridge 11 is pressed by the bias of the resilient member 36 in the direction of arrow B and a portion of the cartridge projects from the player housing. This is illustrated in FIG. 1. As the cartridge 11 is depressed by the resilient member 36, actuation of the switches 38, 39 are broken off the thus opened. Upon the opening of the switches 38, 39, the charge on the condenser 31 is discharged by the high valve resister 43.

Figure 2:
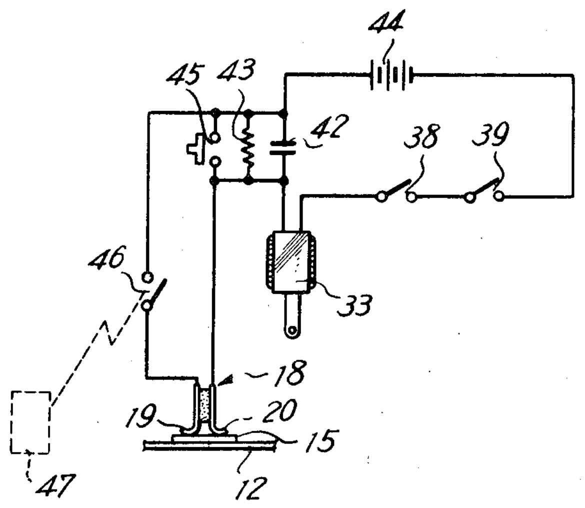
FIG. 2 is a diagram showing a control circuit for the solenoid in FIG. 1.

As described in the above, according to the apparatus shown in FIGS. 1 and 2, insertion of the cartridge in the player housing allows the cartridge to automatically move to the play position as shown by the dot and dash lines by means of the cartridge moving lever 23 whereas the cartridge is automatically retracted from the play position by the lever 23 to stop its play in response to the closing the switch 45 as manually operated or passage of the conducive patch 15 on the tape 12 through the detector 18.

The number of switches 38, 39 actuated by the cartridge may be either one, however, advantage derived from the use of the two switches is that the solenoid 33 is energized only when the cartridge is precisely inserted in a predetermined position so that movement of the lever 23 from the first position to the leftward direction prior to the insertion of the cartridge in the predetermined position is prevented.

Figure 3:
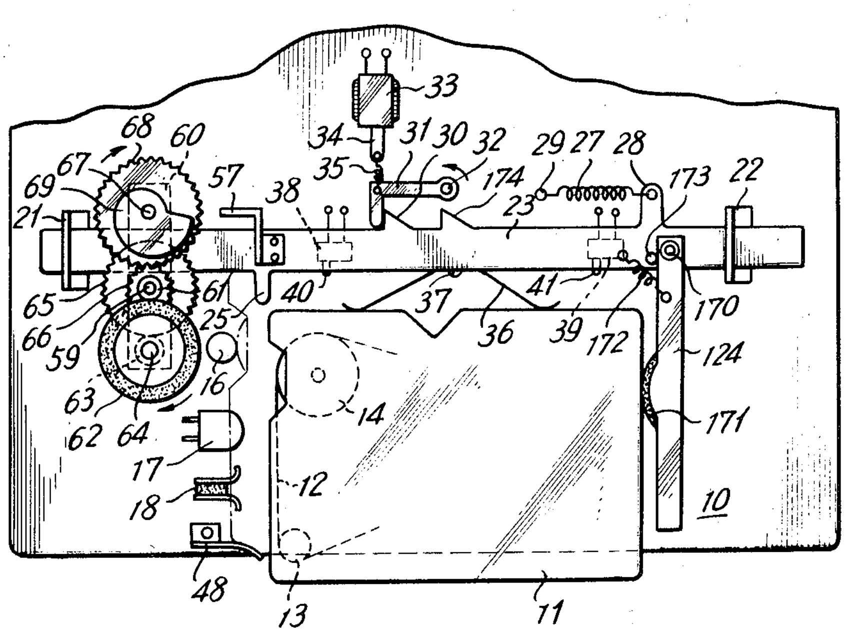
FIG. 3 is a schematic view of another embodiment of a tape cartridge positioning apparatus.

FIG. 3 shows another embodiment of the tape cartridge positioning apparatus according to the invention, wherein similar numerals are used to illustrate like parts in FIG. 1.

A rear arm 124 corresponding to the rear arm 24 (FIG. 1) has one end which is swingably supported by a pin 170 connected to the cartridge moving lever 23. The rear arm 124 is provided with a pad 171 attached thereto. A pad 171 is adapted to abut against the cartridge at its rear edge. A spring 172 is trained between the rear arm 124 and the lever 24, and the rear arm 124 is clockwise biased, however, movement of the rear arm due to the spring 172 is limited by a stopper pin 173 mounted to the lever 23. The lever 23 is provided with another projection 174 rightwardly of the projection 30.

Now, the cartridge 11 is inserted to the position where the switches 38, 39 are actuated, the solenoid 33 is energized in pulse fashion by a control circuit (not shown) similar to the control circuit shown in FIG. 2 so that the latch lever 31 is instantly swung to the position where it is disengaged from the projection 30 to release retension of the lever 23. As a result, the lever 23 is leftwardly moved by the bias of the tension spring 27 until the projection 174 engages the latch lever 31. The cartridge 11 is moved to the play position as shown by the dot and dash lines and urged by the pinch roller 14 and the capstan 16 as the rear edge thereof is pressed by the rear arm 124 before leftward movement of the lever 23 is prevented by engagement of the projection 174 with the latch lever 31. There the lever 23 is retained by engagement of the projection 174 with the latch lever, the rear arm 124 is counterclockwise swung against the bias of the spring 172 and abutment between the pinch roller 14 and the capstan 16 is obtained by the bias of the spring 172. The solenoid 33 is energized by the control circuit similar to that shown in FIG. 2 during the play of the cartridge 11, the latch lever 31 is moved to the position where it is disengaged from the projection 174. This causes the lever 23 to leftwardly move again by the bias of the spring 27, and the end of the arm 57 on the lever 23 abut against the minimum deformed portion of the cam 69 to swung the swing lever 60 to the position where the wheel 62 abuts against the capstan 16. Consequently, the cam 69 initiates its rotation and the lever 23 is gradually moved in the rightward direction against the bias of the spring 27. The cam 69 is rotated through its turn, the lever 23 is returned to its original position by engagement of the projection 30 with the latch lever 31. Accordingly, abutment between the wheel 62 and the capstan 16 given by the bias of the tension spring 27 decays to stop rotation of the wheel 62 at the same time rotation of the cam 69 is stopped. During the time that the lever 23 is rightwardly moved and returned to the first position, the leading edge of the cartridge 11 is pressed by the front arm 25 and thus the cartridge is moved back from the play position. This causes the front cartridge corners of the cartridge 11 to escape away of the guide member 48 and to press out to the position as shown by the bias of the resilient member 36.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is:

1. A tape cartridge positioning apparatus for an endless magnetic tape cartridge player, the player including a player housing with an opening through which an endless magnetic tape cartridge is laterally inserted, and a deck in the player housing on which the cartridge is deposited and to which are mounted a rotary capstan for driving the tape in the cartridge and at least one magnetic head adapted to transduce the tape comprising:

a cartridge moving lever provided on said player deck reciprocally movable in the direction perpendicular to the insertable movement of said cartridge and engageable with inserted cartridges in the player housing and on the deck for moving the cartridge from a predetermined nonplay position away from the capstan and the magnetic head into a play position where the cartridge is played by the capstan and the magnetic head and back into the nonplay position:

a tension spring coupled to the cartridge moving lever for biasing the cartridge moving lever in the direction that the cartridge is moved from the nonplay position into the play position;

a latch means engageable with the cartridge moving lever when the cartridge moving lever is in a first position where the cartridge is to be inserted is held in the player housing for its play or in a second position where the cartridge is moved into the play position;

a solenoid coupled to the latch means for moving the latch means into the position where the latch means is disengaged from the cartridge moving lever when the solenoid is energized:

a control circuit for controlling operation of the solenoid, said control circuit including at least one switch closed in response to insertion of the cartridge into a position where it is held by the cartridge moving lever at the first position, a power source for energizing the solenoid, a circuit for applying the current from said power source to the solenoid in pulse fashion and operating the solenoid in pulse fashion when the switch is closed, and a manual operating switch manually operated and closed for ending the play and then operating the solenoid in aid of said power source, said cartridge moving lever being moved from the first position into the second position by the bias of the tension spring in response to closing of said switch and operation of the solenoid in pulse fashion at the sage time the cartridge is moved into the play position by the cartridge moving lever;

a lever moving means for moving the cartridge moving lever from the second position into the first position against the bias of the tension spring, said lever moving mean including a swing lever swingably provided on the deck, a frictional idler wheel rotatably provided on said swing lever, a cam rotatably provided on said swing lever, and means for reducing rotation of said wheel and imparting said rotation to said cam, said swing lever being moved by the cartridge moving lever to a position where said wheel abuts against the capstan when the solenoid is energized by the control circuit and the latch means is moved into a position where it is disengaged from the cartridge moving lever in the second position, said wheel being rotatably driven by abutment with the capstan to rotate said cam, the cartridge moving lever being in contact with said cam under the influence of the tension spring and being moved by rotation of the cam against the bias of the tension spring to rotate the cam through about a turn and then being returned to the first position and engaged by the latch means, said cam being rotated through a turn and disengaged from the cartridge moving lever to extinguish abutment force between said wheel and the capstan to stop rotation of the wheel and the cam, the cartridge being moved from the play position into the nonplay position by the cartridge moving lever when the cartridge moving lever is returned to the first position.

2. A tape cartridge positioning apparatus for an endless magnetic tape cartridge player in accordance with claim 1, wherein said cartridge moving lever having a trigger lever slidable in its slidable direction thereon, the trigger lever being biased in one direction by a spring with respect to the cartridge moving lever, said latch means being engaged with the trigger lever when the cartridge moving lever is moved into said second position, the trigger lever being prevented from moving with the cartridge moving lever to store energy in the spring, in response to movement of the latch means by said solenoid to a position where it is disengaged from the trigger lever the trigger lever being moved by the bias of the spring and abutting against said swing lever, said swing lever being moved into a position where said wheel abuts against said capstan.

3. A tape cartridge positioning apparatus for an endless magnetic tape cartridge player in accordance with claim 2, wherein said cartridge moving lever having an arm engageable with said cam, a front and rear arms holding said cartridge to be inserted in said player housing, the cartridge being advanced as the rear edge thereof is pressed by the rear arm when the cartridge moving lever is moved from said first position into said second position while the cartridge is retracted as the leading edge thereof is pressed by the front arm when the cartridge moving lever is moved from the second position into the first position.

4. A tape cartridge positioning apparatus for an endless magnetic tape cartridge player in accordance with claim 3, wherein said cartridge moving lever has a projection engageable with said latch means in said first position while said trigger lever has the other projection engageable with the latch means when said cartridge moving lever is located in said second position.

5. A tape cartridge positioning apparatus for an endless magnetic tape cartridge player in accordance with claim 1, wherein said cartridge moving lever includes an arm engageable with said cam, and a front and rear arm holding said cartridge inserted in said player housing, the rear arm being swingably mounted with respect to the cartridge moving lever and given the rotational force by a spring, rotation of the rear arm by the spring by a stopper mounted to the cartridge moving lever so as to allow the rear arm to be positioned approximately parallel to the front arm, the rear arm being in contact with the rear edge of the cartridge when the cartridge moving lever is moved into said second position, the rear arm biasing the cartridge to the play position by the bias of the spring, the cartridge being retracted as the leading edge thereof is pressed by the front arm when the cartridge moving lever is moved from the second position into said first position.

6. A tape cartridge positioning apparatus for an endless magnetic tape cartridge player in accordance with claim 5, wherein said cartridge moving lever has a projection engageable with said latch means in said first position and the other projection engageable with the latch means in said second position.

7. A tape cartridge positioning apparatus for an endless magnetic tape cartridge player in accordance with claim 1, wherein said cartridge moving lever includes a resilient member providing the bias for pressing out of the play housing said cartridge moved from said play position into said nonplay position.

8. A tape cartridge positioning apparatus for an endless magnetic tape cartridge player in accordance with claim 1, wherein said control circuit includes a pair of feeler contacts insulated from each other connected in parallel to said manual operating and is provided in said player deck, the feeler contacts having a detector shorted by a conductive foil mounted on said tape.

* * * * *